(12) United States Patent
Chan (10) Patent No.: US 12,208,849 B2
(45) Date of Patent: Jan. 28, 2025

(54) LOCKING SYSTEM AND UNLOCKING METHOD FOR ELECTRIC BICYCLE

(71) Applicant: Acer Incorporated, New Taipei (TW)

(72) Inventor: Cheng-Hsiu Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 154 days.

(21) Appl. No.: 18/302,812

(22) Filed: Apr. 19, 2023

(65) Prior Publication Data

US 2024/0300598 A1 Sep. 12, 2024

(30) Foreign Application Priority Data

Mar. 8, 2023 (TW) ................................ 112108588

(51) Int. Cl.
*B62H 5/14* (2006.01)
*B62J 45/412* (2020.01)
*B62J 45/413* (2020.01)

(52) U.S. Cl.
CPC .............. *B62H 5/14* (2013.01); *B62J 45/412* (2020.02); *B62J 45/413* (2020.02)

(58) Field of Classification Search
CPC ... B62H 5/00; B62H 5/003; B62H 5/14; B62J 45/00; B62J 45/40; B62J 45/41; B62J 45/411; B62J 45/412; B62J 45/413
USPC .......................................................... 70/233
See application file for complete search history.

(56) References Cited

U.S. PATENT DOCUMENTS

| | | | |
|---|---|---|---|
| 2017/0225742 A1* | 8/2017 | Hancock | B62M 6/45 |
| 2020/0010137 A1* | 1/2020 | Komemushi | B62M 6/80 |
| 2020/0010144 A1* | 1/2020 | Kondo | B62J 45/00 |
| 2020/0014321 A1* | 1/2020 | Kondo | H02P 21/0021 |
| 2020/0014322 A1* | 1/2020 | Kondo | B62J 50/20 |

FOREIGN PATENT DOCUMENTS

| | | | | |
|---|---|---|---|---|
| CN | 105882796 | | 8/2016 | |
| EP | 2607223 A1 | * | 6/2013 | ............. B62M 6/50 |
| EP | 3069968 A1 | * | 9/2016 | |
| TW | 201821317 | | 6/2018 | |

* cited by examiner

*Primary Examiner* — Nathan Cumar
(74) *Attorney, Agent, or Firm* — JCIPRNET (57) ABSTRACT

A locking system and an unlocking method for an electric bicycle are provided. The locking system of the electric bicycle includes a locking device, a rotational speed sensor, a torque sensor, and a controller. The rotational speed sensor senses rotation direction information of a crank arm of the electric bicycle. The torque sensor obtains torque information exerted by the crank arm on a chainring of the electric bicycle. The controller is coupled to the locking device, the rotational speed sensor and the torque sensor. In response to the locking device is being a locking state, the controller unlocks the locking device according to the rotation direction information and torque information.

20 Claims, 6 Drawing Sheets

LOCKING SYSTEM AND UNLOCKING METHOD FOR ELECTRIC BICYCLE

CROSS-REFERENCE TO RELATED APPLICATION

This application claims the priority benefit of Taiwan application serial no. 112108588, filed on Mar. 8, 2023. The entirety of the above-mentioned patent application is hereby incorporated by reference herein and made a part of this specification.

BACKGROUND

Technical Field

The disclosure relates to an anti-theft system of bicycle, and particularly relates to a locking system and an unlocking method for an electric bicycle.

Description of Related Art

Along with the rise of environmental awareness, the number of people riding bicycles is increasing day by day. Among the bicycles, electrically assisted electric bicycles are becoming more and more popular because they are electrically assisted and require less strength for riding. However, due to the lightness of bicycles, they are very vulnerable to theft and are easy to be improperly used. Therefore, for bicycles of any type, suitable locking mechanisms or locks are often used in conjunction with them to prevent the bicycles from being stolen or used improperly after a ride or when not riding for a while. The most common and conventional locks require the use of keys to implement locking and unlocking, but a rider may not be able to unlock the bicycle due to the loss of the key, or the bicycle may be lost because the key has been stolen. Therefore, how to design a kind of effective and convenient bicycle anti-theft system is a goal of those skilled in the art.

SUMMARY

The disclosure is directed to a locking system and unlocking method for an electric bicycle, which are adapted to improve the convenience of unlocking the electric bicycle.

An embodiment of the disclosure provides a locking system of an electric bicycle, which includes a locking device, a rotational speed sensor, a torque sensor, and a controller. The rotational speed sensor senses rotation direction information of a crank arm of the electric bicycle. The torque sensor obtains torque information exerted by the crank arm on a chainring of the electric bicycle. The controller is coupled to the locking device, the rotational speed sensor and the torque sensor. In response to the locking device being in a locking state, the controller unlocks the locking device according to the rotation direction information and the torque information.

An embodiment of the disclosure provides an unlocking method for an electric bicycle, which includes the following steps. A rotational speed sensor is used to sense rotation direction information of a crank arm of the electric bicycle. A torque sensor is used to obtain torque information exerted by the crank arm on a chainring of the electric bicycle. In response to the locking device of the electric bicycle being in a locking state, the locking device is unlocked according to the rotation direction information and the torque information.

Based on the above description, in the embodiments of the disclosure, the rotational speed sensor and the torque sensor may be used to obtain the rotation direction information and the torque information of the crank arm respectively, and it is determined whether to unlock the locking device of the electric bicycle according to the rotation direction information and the torque information of the crank arm. In this way, a user may unlock the electric bicycle by pedalling a pedal of the electric bicycle, which not only has a good anti-theft effect, but also improves the convenience of unlocking the electric bicycle.

DESCRIPTION OF THE EMBODIMENTS

Some embodiments of the invention will be described in detail with reference to the accompanying drawings. For the described referential symbols in the following description, when the same referential symbols appear in different drawings, they will be regarded as the same or similar components. These embodiments are only a part of the invention, and do not reveal all possible implementation modes of the invention. Rather, these embodiments are only examples within a scope of the patent application of the invention.

Figure 1:
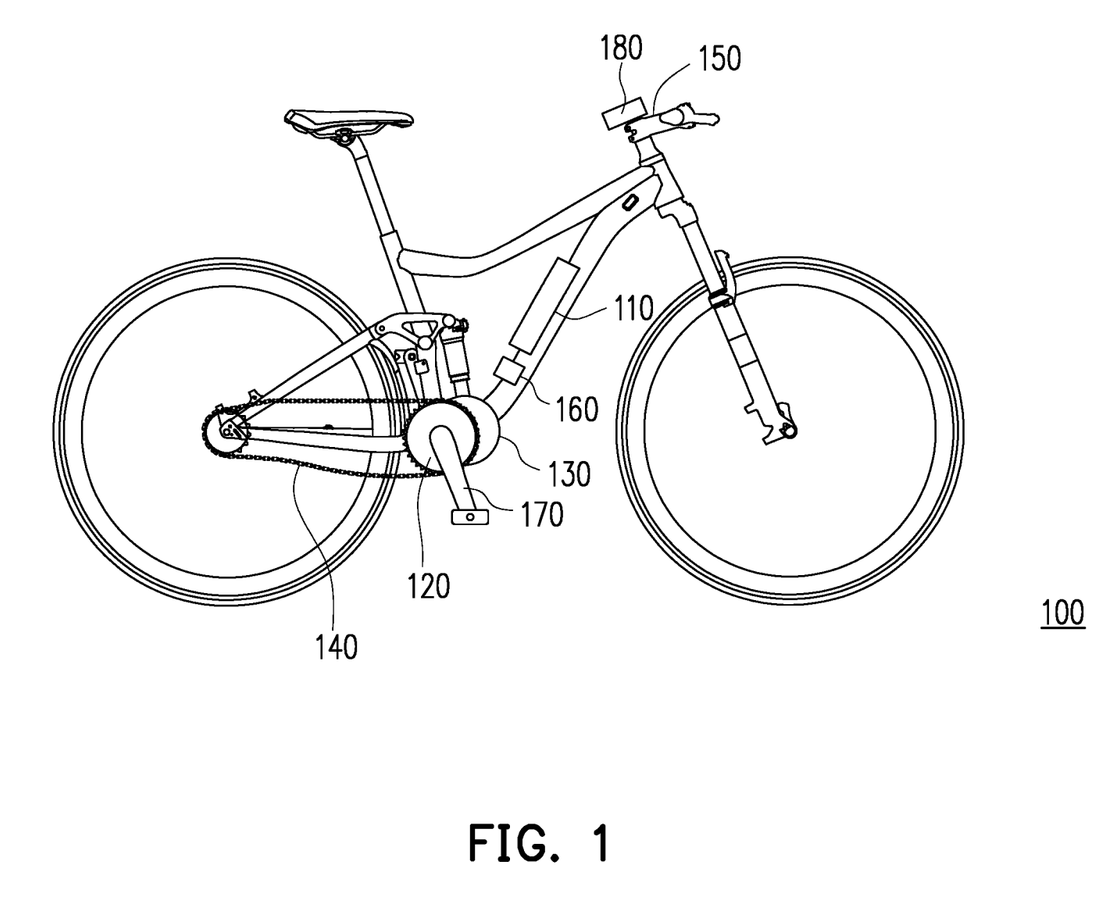
FIG. 1 is a schematic diagram of an electric bicycle according to an embodiment of the disclosure.

Referring to FIG. 1, FIG. 1 is a schematic diagram of an electric bicycle according to an embodiment of the disclosure. In the embodiment, an electric bicycle 100 includes a battery module 110, a chainring 120, a motor 130, a chain 140, a control handle 150, a controller 160, a crank arm 170, and a human-machine interface 180.

The battery module 110, the motor 130 and the controller 160 may be integrated into a driving device for driving the electric bicycle 100. The battery module 110 stores a driving electric power and provides the stored driving electric power. The motor 130 may drive the chainring 120 through the driving electric power, and the chainring 120 generates a driving torque. In addition, a user may pedal a pedal of the electric bicycle 100 to drive the crank arm 170 and the chainring 120 to rotate, so that the chainring 120 generates the driving torque. The chain 140 may transmit the driving torque to at least one wheel of the electric bicycle 100, such as a rear wheel, so as to drive the electric bicycle 100 to move forward. The control handle 150 is operated to control a direction of the electric bicycle 100 and a speed of the electric bicycle 100.

In some embodiments, the controller 160 is, for example, a programmable general-purpose or special-purpose microprocessor, a digital signal processor (DSP), a programmable controller, special application specific integrated circuits (ASIC), a programmable logic device (PLD) or other similar devices or a combination of these devices, which may load and execute software/firmware codes.

The human-machine interface 180 may include a display device for displaying operation information of the electric bicycle 100. The human-machine interface 180 may include an input device for receiving a control command of the user. For example, the human-machine interface 180 may be implemented as an instrument device of the electric bicycle 100, which may include buttons and a display panel.

Figure 2:
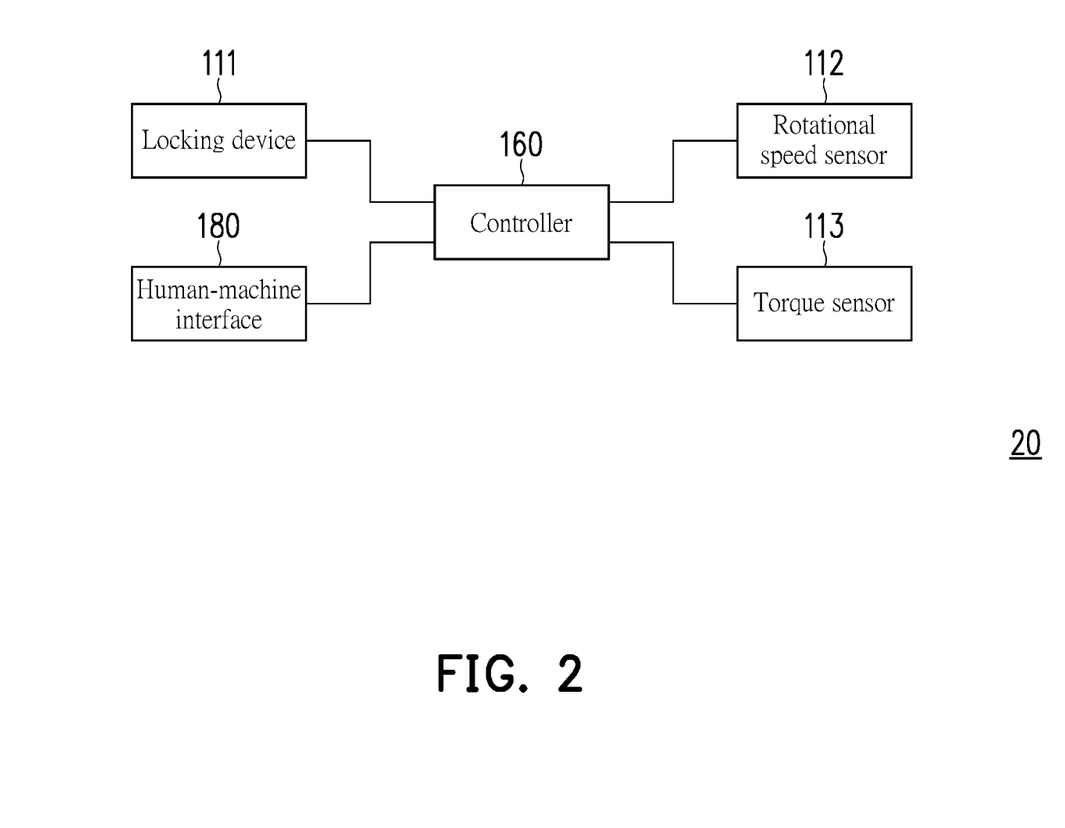
FIG. 2 is a schematic diagram of a locking system of an electric bicycle according to an embodiment of the disclosure.
Figure 3:
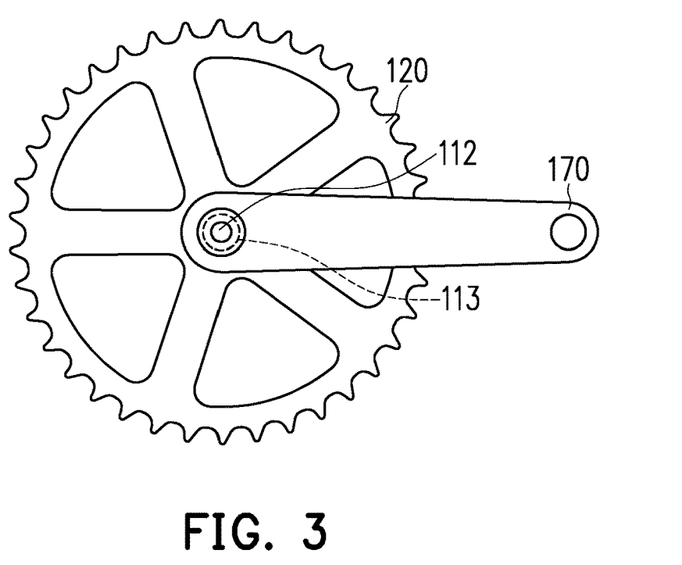
FIG. 3 is a schematic diagram of a crank arm according to an embodiment of the disclosure.

FIG. 2 is a schematic diagram of a locking system of an electric bicycle according to an embodiment of the disclosure. FIG. 3 is a schematic diagram of a crank arm according to an embodiment of the disclosure. Referring to FIG. 2 and FIG. 3, the locking system 20 of the electric bicycle 100 may include a locking device 111, a rotational speed sensor 112, a torque sensor 113, the controller 160, and the human-machine interface 180. The controller 160 is coupled to the locking device 111, the rotational speed sensor 112, the torque sensor 113, and the human-machine interface 180.

The rotational speed sensor 112 is used for sensing rotational speed information and rotation direction information of the crank arm 170 of the electric bicycle 100. The rotational speed sensor 112 may be implemented as a cadence sensor. Specifically, the rotational speed sensor 112 may sense whether the crank arm 170 is rotating in a forward direction (clockwise direction) or in a reverse direction (counter clockwise direction).

The torque sensor 113 is configured to sense torque information exerted by the crank arm 170 to the chainring 120 of the electric bicycle 100. The torque information exerted by the crank arm 170 to the chainring 120 is related to a pedalling force exerted by the user on the crank arm 170. In some embodiments, the torque sensor 113 may be a central shaft type torque sensor. In some other embodiments, the torque sensor 113 is a chainring type torque sensor.

The locking device 111 may be switched between a locking state and an unlocking state. In response to the locking device 111 being in the locking state, the locking device 111 may lock the electric bicycle 100 so that the electric bicycle 100 cannot move normally. Conversely, in response to the locking device 111 being in the unlocking state, the locking device 111 unlocks the electric bicycle 100, and the electric bicycle 100 is allowed to move normally. The locking device 111 may be implemented as a lock mechanism of different forms, which is not limited by the disclosure. The locking device 111 may be locked and unlocked according to a control signal sent by the controller 160.

Figure 4:
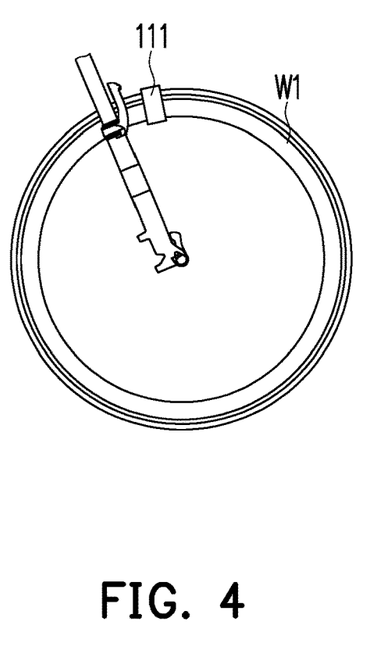
FIG. 4 is a schematic diagram of a locking device according to an embodiment of the disclosure.

In some embodiments, in response to the locking device 111 being in the locking state, the locking device 111 may block rotation of a wheel with a structural member, so that the electric bicycle 100 cannot move. For example, the locking device 111 may block the rotation of the wheel or lock an axle through a latch. FIG. 4 is a schematic diagram of a locking device according to an embodiment of the disclosure. Referring to FIG. 4, the locking device 111 may be disposed on a front wheel W1 of the electric bicycle 100. In response to the locking device 111 being in the locking state, the latch of the locking device 111 blocks the rotation of the front wheel W1 to lock the electric bicycle 100.

Alternatively, in some embodiments, in response to the locking device 111 being in the locking state, the locking device 111 may lock a head of the electric bicycle 100, so that the head of the electric bicycle 100 cannot be rotated. In some embodiments, in response to the locking device 111 being in the locking state, the locking device 111 may lock the electric bicycle 100 to a parking frame, so that the electric bicycle 100 cannot move because a certain wheel is suspended in the air. In some embodiments, the locking device 111 may be an internal component of the motor 130. In response to the locking device 111 being in the locking state, the locking device 111 may lock the motor 130 so that the motor 130 cannot run.

In some embodiments, in response to the controller 160 receiving a locking command via the human-machine interface 180, the controller 160 controls the locking device 11 to be in the locking state. For example, the user may issue the locking command by pressing a button on the human-machine interface 180 to lock the electric bicycle 100.

In response to the locking device 111 being in the locking state, the controller 160 may unlock the locking device 111 according to the rotation direction information and the torque information. In detail, the controller 160 may receive the rotation direction information from the rotational speed sensor 112 and receive the torque information from the torque sensor 113. In response to the locking device 111 being in the locking state, the controller 160 may determine whether the rotation direction information provided by the rotational speed sensor 112 and the torque information provided by the torque sensor 113 meet an unlocking condition. In response to the rotation direction information provided by the rotational speed sensor 112 and the torque information provided by the torque sensor 113 meeting the unlocking condition, the controller 160 may unlock the locking device 111 to switch the locking device 111 from the locking state to the unlocking state. In response to the rotation direction information and the torque information not meeting the unlocking condition, the controller 160 controls the locking device 111 to maintain the locking state.

In this way, by pedalling on the pedal of the electric bicycle 100 to control a rotation direction and a crank arm position of the crank arm 170, a legal user may unlock the electric bicycle 100 smoothly. Therefore, the user does not need to use a key or other device to unlock the electric bicycle 100, which greatly improves the convenience of unlocking the electric bicycle 100.

In some embodiments, the rotation direction information sensed by the rotational speed sensor 112 may include multiple input rotation directions, and the input rotation directions may include a forward rotation direction and a reverse rotation direction. The controller 160 may determine whether these input rotation directions meet the unlocking condition. In some embodiments, the torque information sensed by the torque sensor 113 may include multiple torque values. The torque values output by the torque sensor 113 may be used to detect a position of the crank arm 170. The controller 160 may determine whether these torque values meet the unlocking condition. In response to these input rotation directions and these torque values meeting the unlocking condition, the controller 160 may unlock the locking device 111.

In some embodiments, the unlocking condition includes multiple unlocking rotation directions and multiple unlocking torque values sorted according to an unlocking sequence. The unlocking torque values and the unlocking rotation directions are arranged alternately according to the unlocking sequence. For example, the unlocking condition may be "a first unlocking torque value→forward rotation direction→a second unlocking torque value". Alternatively, the unlocking condition may be "the first unlocking torque value→reverse rotation direction→the second unlocking torque value→forward rotation direction→a third unlocking torque value". The unlocking condition may be set by the user.

In some embodiments, in response to multiple input rotation directions and multiple torque values sorted according to an input sequence meeting the unlocking rotation directions and the unlocking torque values sorted according to the unlocking sequence, the controller 160 may determine that the rotation direction information and the torque information meet the unlocking condition. Namely, in response to the crank arm 170 sequentially rotating along the unlocking rotation directions to multiple crank arm positions corresponding to the unlocking torque values, the locking device 11 may be switched from the locking state to the unlocking state.

In some embodiments, the unlocking condition may be set by the user. During a setting phase of the unlocking condition, the controller 160 may use the rotational speed sensor 112 and the torque sensor 113 to obtain multiple unlocking rotation directions and multiple unlocking torque values sorted according to an unlocking sequence.

It should be noted that, before the setting phase of the unlocking condition, the controller 160 needs to establish multiple preset torque values corresponding to multiple crank arm positions. Afterwards, the controller 160 may detect the unlocking torque values set by the user according to these preset torque values, and detect multiple torque values input by the user in response to unlocking the electric bicycle 100 according to these preset torque values.

In some embodiments, before the setting phase of the unlocking condition, the human-machine interface 180 prompts the user to move the crank arm 170 to multiple crank arm positions, respectively. The controller 160 uses the torque sensor 113 to respectively obtain the preset torque values corresponding to the crank arm positions in response to the crank arm 170 being stationary.

Figure 5:
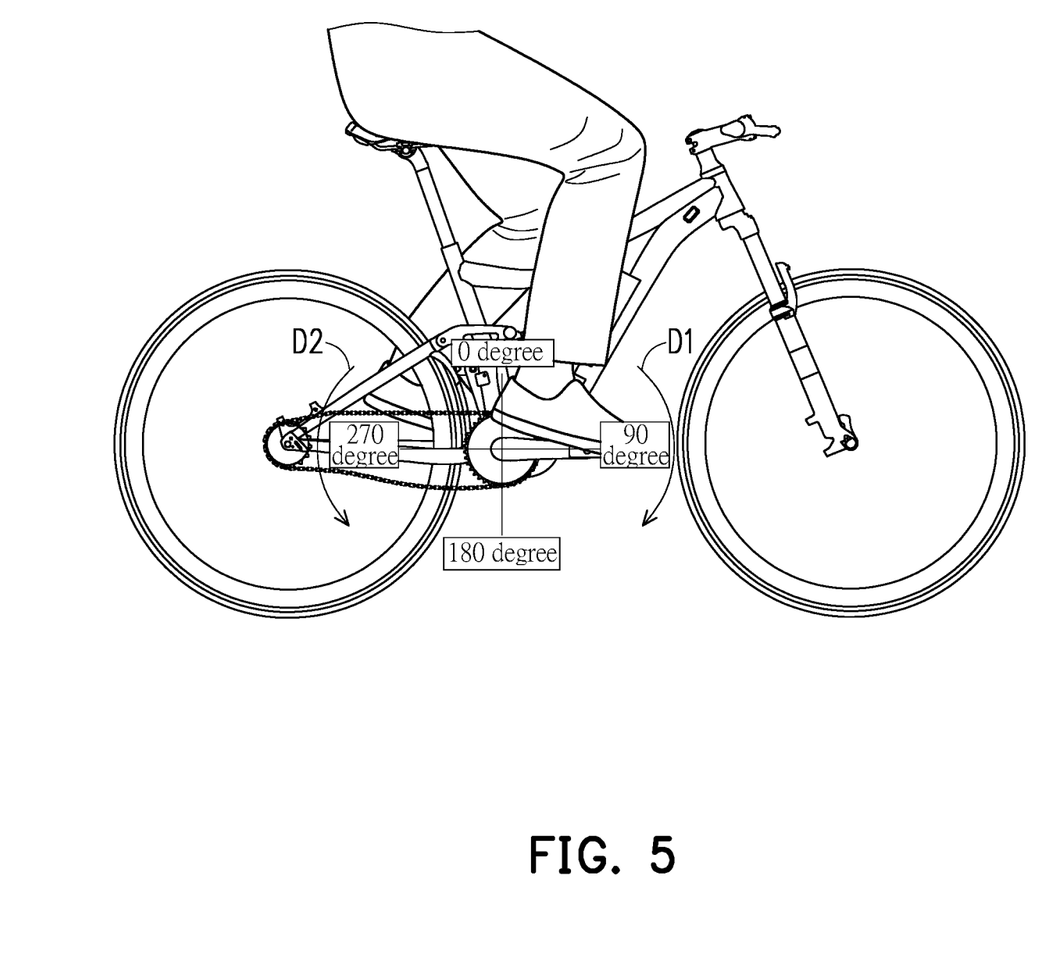
FIG. 5 is a schematic diagram illustrating multiple crank arm positions and crank arm rotation directions according to an embodiment of the disclosure.

FIG. 5 is a schematic diagram illustrating multiple crank arm positions and crank arm rotation directions according to an embodiment of the disclosure. Referring to FIG. 5, the controller 160 may use the torque sensor 113 to obtain the preset torque values corresponding to the crank arm positions. Specifically, before the setting phase of the unlocking condition, under the prompt of the man-machine interface 180, the user may pedal on the pedal to rotate the crank arm 170 to the crank arm positions in sequence. In the example of FIG. 5, the crank arm 170 rotates 360 degrees for one revolution, and these crank arm positions may be respectively expressed as a 0-degree position, a 90-degree position, a 180-degree position and a 270-degree position. In response to the crank arm position being at the 0-degree position and the 180-degree position, the crank arm 170 presents a vertical state. In response to the crank arm position being at the 90-degree position and the 270-degree position, the crank arm 170 presents a horizontal state. In response to the crank 170 being sequentially stationary at these crank arm positions under the condition that the user does not apply force to the pedal, the torque sensor 113 may output four preset torque values corresponding to the 0-degree position, the 90-degree position, the 180-degree position and the 270-degree position. Correspondingly, the controller 160 may obtain the four preset torque values corresponding to the 0-degree position, the 90-degree position, the 180-degree position and the 270-degree position, as shown in Table 1.

TABLE 1

| Crank arm position | Preset torque value |
| --- | --- |
| 0 degree | T1 |
| 90 degree | T2 |
| 180 degree | T3 |
| 270 degree | T4 |

In addition, the rotational speed sensor 112 may sense the rotation direction of the crank 170 to be a forward rotation direction D1 or a reverse rotation direction D2.

Thus, after obtaining the preset torque values corresponding to the crank arm positions, the human-machine interface 180 may prompt the user to set the unlocking condition during the setting phase of the unlocking condition. For example, in the setting phase of the unlocking condition, the user may sequentially rotate the crank arm 170 to "the 90-degree position, the 270-degree position, the 0-degree position". Correspondingly, the controller 160 may use the torque sensor 113 to detect multiple unlocking torque values based on the preset torque values in table 1. It should be noted that the unlocking torque values actually detected by the torque sensor 113 may be slightly different from the preset torque values. In other words, in response to the controller 160 determining that a difference between a certain sensed value output by the torque sensor 113 and any one of the preset torque values is less than a tolerance value, the controller 160 may determine that a corresponding unlocking torque value is detected. In other words, in some embodiments, each unlocking torque value in the unlocking condition may be one of the preset torque values. Alternatively, in some other embodiments, each unlocking torque value in the unlocking condition may be another torque value that differs from one of the preset torque values by less than the tolerance value.

In addition, in response to the user controlling the crank arm 170 to first rotate from the "90-degree position" along the reverse rotation direction D2 to the "270-degree position", the controller 160 may detect the reverse rotation direction D2 through the rotational speed sensor 112, and take the reverse rotation D2 as one of the unlocking rotation directions. Thereafter, in response to the user controlling the crank arm 170 to rotate from the "270-degree position" along the forward rotation direction D1 to the "0-degree position", the controller 160 may detect the forward rotation direction D1 through the rotation speed sensor 112, and take this forward rotation direction D1 as another one of the unlocking rotation directions. According to the preset torque values in table 1, the first unlocking torque value in the unlocking condition may be a preset torque value T2 corresponding to the 90-degree position; the second unlocking torque value in the unlocking condition is a preset torque value T4 corresponding to the 270-degree position; the third unlocking torque value in the unlocking condition is a preset torque value T1 corresponding to the 0-degree position. The first unlocking rotation direction in the unlocking condition is the reverse rotation direction; and the second unlocking rotation direction in the unlocking condition is the forward rotation direction. Namely, the unlocking condition may be expressed as "the first unlocking torque value corresponding to the 90-degree position→the reverse rotation direction→the second unlocking torque value corresponding to the 270-degree position→the forward rotation direction→the third unlocking torque value corresponding to the 0-degree position". It may be seen that the user may set the unlocking condition by controlling the rotation of the crank arm 170, and the unlocking condition includes multiple unlocking torque values and multiple unlocking rotation directions arranged in alternation.

Figure 6:
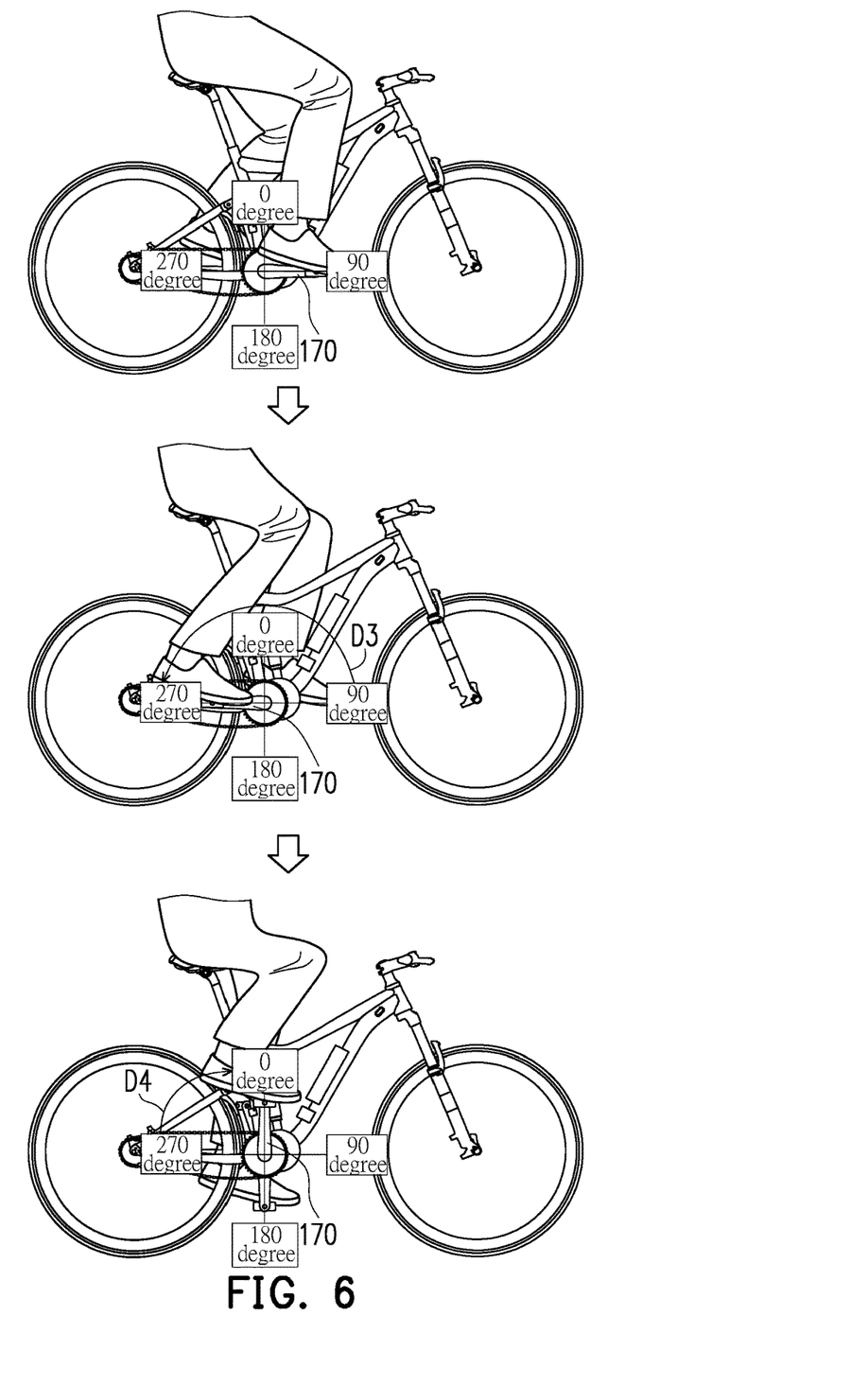
FIG. 6 is a schematic diagram of an unlocking method according to an embodiment of the disclosure.

FIG. 6 is a schematic diagram of an unlocking method according to an embodiment of the disclosure. Referring to FIG. 6, under the condition that the locking device 111 is in the locking state, the user may issue an unlocking activation command through the human-machine interface 180, and the controller 160 may receive the unlocking activation command through the human-machine interface 180. In response to receiving the unlock activation command, the controller 160 uses the rotational speed sensor 112 and the torque sensor 113 to obtain multiple input rotation directions and multiple torque values sorted according to an input sequence. It should be noted that the controller 160 may also detect these torque values used for unlocking the locking device 111 based on the preset torque values corresponding to the crank arm positions.

In detail, after the user issues the unlocking activation command through the human-machine interface 180, the user may control the crank arm 170 to rotate to the 90-degree position first, and make the crank arm 170 to be stationary at the 90-degree position. Correspondingly, the controller 160 may use the torque sensor 113 to detect a torque value corresponding to the 90-degree position, so as to obtain the first torque value. Then, the user may control the crank arm 170 to rotate to the 270-degree position along a reverse rotation direction D3, and make the crank arm 170 to be stationary at the 270-degree position. Correspondingly, the controller 160 may use the rotational speed sensor 112 to obtain the first input rotation direction as the reverse rotation direction D3. Moreover, the controller 160 may use the torque sensor 113 to detect a torque value corresponding to the 270-degree position to obtain the second torque value. Thereafter, the user may control the crank arm 170 to rotate to the 0-degree position along a forward rotation direction D4, and make the crank arm 170 to be stationary at the 0-degree position. Correspondingly, the controller 160 may use the rotational speed sensor 112 to obtain the second input rotation direction as the positive rotation direction D4. In addition, the controller 160 may use the torque sensor 113 to detect a torque value corresponding to the 0-degree position to obtain a third torque value. Based on the example shown in FIG. 6, the controller 160 may obtain multiple input rotation directions and multiple torque values sorted according to the input sequence, which may be expressed as "the first torque value corresponding to the 90-degree position→the reverse rotation direction→the second torque value corresponding to the 270-degree position→the positive rotation direction→the third toque value corresponding to the 0-degree position".

Based on the example shown in FIG. 6, it is assumed that the unlocking condition is "the first unlocking torque value corresponding to the 90-degree position→the reverse rotation direction→the second unlocking torque value corresponding to the 270-degree position→the forward rotation direction→the third unlocking torque value corresponding to the 0-degree position", and the input rotation directions and plurality of torque values sorted according to the input sequence meet the unlocking rotation directions and the unlocking torque values sorted according to the unlocking sequence, the controller 160 may determine that the rotation direction information and the torque information meet the unlocking condition. Namely, in response to each torque value for unlocking being the same or sufficiently close to the corresponding unlocking torque value, and each input rotation direction is the same as the corresponding unlocking rotation direction, the controller 160 may unlock the locking device 111.

Figure 7:
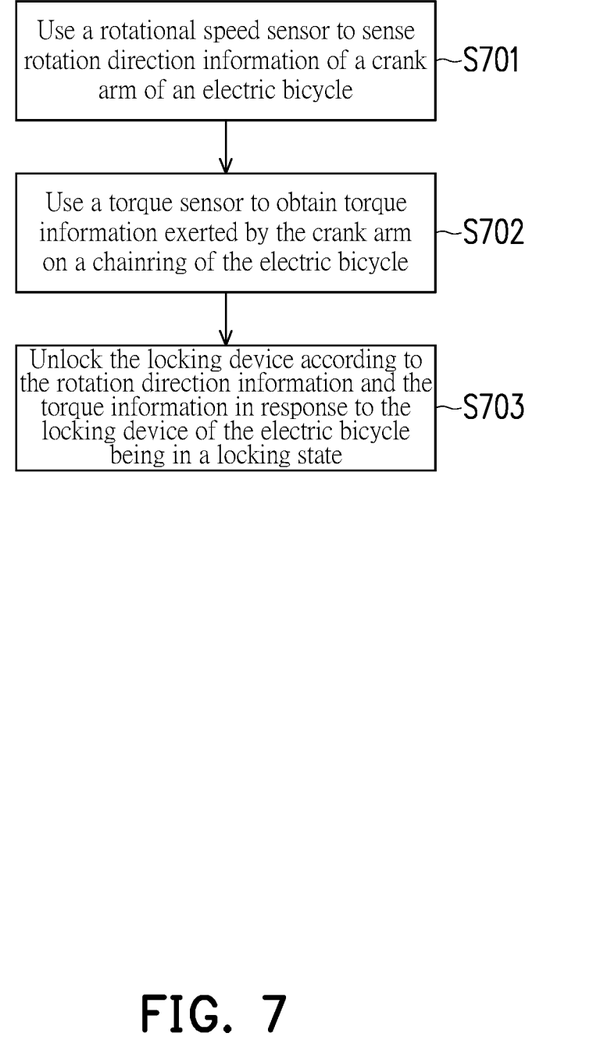
FIG. 7 is a flowchart of an unlocking method according to an embodiment of the disclosure.

FIG. 7 is a flowchart of an unlocking method according to an embodiment of the disclosure. The method is applicable to the electric bicycle 100 and the locking system 20 thereof shown in FIG. 1 and FIG. 2. In step S701, the rotational speed sensor 112 is used to sense rotation direction information of the crank arm 170 of the electric bicycle 100. In step S702, the torque sensor 113 is used to obtain torque information exerted by the crank arm 170 on the chainring 120 of the electric bicycle 100. In step S703, in response to the locking device 111 of the electric bicycle 100 being in the locking state, the locking device 111 is unlocked according to the rotation direction information and the torque information. The implementation method and details of the above steps S701-S703 have been described in detail in the above-mentioned embodiments in FIG. 1 to FIG. 6, so that details thereof are not repeated here.

In summary, in the embodiments of the disclosure, the locking device of the electric bicycle may be unlocked according to the torque information sensed by the torque sensor and the rotation direction information sensed by the rotational speed sensor. The user may unlock the electric bicycle by pedalling the pedal of the electric bicycle. In this way, the electric bicycle may be unlocked without the need for a key or other device, thereby providing a more convenient anti-theft mechanism. In addition, the unlocking method of unlocking the electric bicycle by controlling the rotation of the crank arm is not easy to be seen through or remembered by others. If the user may regularly update the locking condition, the anti-theft effect may be greatly improved.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A locking system of an electric bicycle, comprising:
a locking device;
a rotational speed sensor, configured to sense rotation direction information of a crank arm of the electric bicycle;
a torque sensor, configured to obtain torque information exerted by the crank arm on a chainring of the electric bicycle; and
a controller, coupled to the locking device, the rotational speed sensor, and the torque sensor,
wherein in response to the locking device being in a locking state, the controller unlocks the locking device according to the rotation direction information and the torque information.

2. The locking system of the electric bicycle according to claim 1, wherein the rotation direction information comprises a plurality of input rotation directions, and the input rotation directions comprise a forward rotation direction and a reverse rotation direction.

3. The locking system of the electric bicycle according to claim 1, wherein the torque information comprises a plurality of torque values.

4. The locking system of the electric bicycle according to claim 1, wherein in response to the rotation direction information and the torque information meeting an unlocking condition, the controller unlocks the locking device; and in response to the rotation direction information and the torque information not meeting the unlocking condition, the controller controls the locking device to maintain the locking state.

5. The locking system of the electric bicycle according to claim 4, wherein the unlocking condition comprises a plurality of unlocking rotation directions and a plurality of unlocking torque values sorted according to an unlocking sequence, and the unlocking torque values and the unlocking rotation directions are alternately sorted according to the unlocking sequence.

6. The locking system of the electric bicycle according to claim 5, wherein in response to a plurality of input rotation directions and a plurality of torque values sorted according to an input sequence meeting the unlocking rotation directions and the unlocking torque values sorted according to the unlocking sequence, the controller determines that the rotation direction information and the torque information meet the unlocking condition.

7. The locking system of the electric bicycle according to claim 4, wherein during a setting phase of the unlocking condition, the controller uses the rotational speed sensor and the torque sensor to obtain a plurality of unlocking rotation directions and a plurality of unlocking torque values sorted according to an unlocking sequence.

8. The locking system of the electric bicycle according to claim 7, wherein before the setting phase of the unlocking condition, the controller uses the torque sensor to obtain a plurality of preset torque values corresponding to a plurality of crank arm positions, wherein the controller detects the unlocking torque values set by a user according to the preset torque values.

9. The locking system of the electric bicycle according to claim 8, further comprising a human-machine interface, prompting the user to move the crank arm to the crank arm positions, wherein the controller uses the torque sensor to obtain the preset torque values corresponding to the crank arm positions in response to the crank arm being stationary.

10. The locking system of the electric bicycle according to claim 1, further comprising a human-machine interface, wherein in response to the controller receiving a locking command through the human-machine interface, the controller controls the locking device to be in the locking state.

11. An unlocking method for an electric bicycle, comprising:
    using a rotational speed sensor to sense rotation direction information of a crank arm of the electric bicycle;
    using a torque sensor to obtain torque information exerted by the crank arm on a chainring of the electric bicycle; and
    unlocking a locking device according to the rotation direction information and the torque information in response to the locking device of the electric bicycle being in a locking state.

12. The unlocking method for the electric bicycle according to claim 11, wherein the rotation direction information comprises a plurality of input rotation directions, and the input rotation directions comprise a forward rotation direction and a reverse rotation direction.

13. The unlocking method for the electric bicycle according to claim 11, wherein the torque information comprises a plurality of torque values.

14. The unlocking method for the electric bicycle according to claim 11, wherein unlocking the locking device according to the rotation direction information and the torque information in response to the locking device of the electric bicycle being in the locking state comprises:
    unlocking the locking device in response to the rotation direction information and the torque information meeting an unlocking condition; and
    controlling the locking device to maintain the locking state in response to the rotation direction information and the torque information not meeting the unlocking condition.

15. The unlocking method for the electric bicycle according to claim 14, wherein the unlocking condition comprises a plurality of unlocking rotation directions and a plurality of unlocking torque values sorted according to an unlocking sequence, and the unlocking torque values and the unlocking rotation directions are alternately sorted according to the unlocking sequence.

16. The unlocking method for the electric bicycle according to claim 15, wherein unlocking the locking device in response to the rotation direction information and the torque information meeting the unlocking condition comprises:
    determining, by a controller, that the rotation direction information and the torque information meet the unlocking condition in response to a plurality of input rotation directions and a plurality of torque values sorted according to an input sequence meeting the unlocking rotation directions and the unlocking torque values sorted according to the unlocking sequence.

17. The unlocking method for the electric bicycle according to claim 14, further comprising:
    using the rotational speed sensor and the torque sensor to obtain a plurality of unlocking rotation directions and a plurality of unlocking torque values sorted according to an unlocking sequence during a setting phase of the unlocking condition.

18. The unlocking method for the electric bicycle according to claim 17, further comprising:
    using the torque sensor to obtain a plurality of preset torque values corresponding to a plurality of crank arm positions before the setting phase of the unlocking condition,
    wherein the preset torque values are configured to detect the unlocking torque values set by a user.

19. The unlocking method for the electric bicycle according to claim 18, wherein using the torque sensor to obtain the preset torque values corresponding to the crank arm positions before the setting phase of the unlocking condition comprises:
    using a human-machine interface to prompt the user to move the crank arm to the crank arm positions; and
    using the torque sensor to obtain the preset torque values corresponding to the crank arm positions in response to the crank arm being stationary.

20. The unlocking method for the electric bicycle according to claim 19, further comprising:
    controlling the locking device to be in the locking state in response to receiving a locking command through the human-machine interface.

* * * * *